(12) United States Patent
McCulloch

(10) Patent No.: US 8,082,642 B1
(45) Date of Patent: Dec. 27, 2011

(54) ARTICULATING HEAD WITH LINEAR MOVEMENT ASSEMBLY FOR COMPUTER CONTROLLED MILLING MACHINES

(75) Inventor: Joseph W. McCulloch, Bellefonte, PA (US)

(73) Assignee: Paradyne Technologies Inc, State College, PA (US)

( * ) Notice: Subject to any disclaimer, the term of this patent is extended or adjusted under 35 U.S.C. 154(b) by 226 days.

(21) Appl. No.: 12/349,690

(22) Filed: Jan. 7, 2009

Related U.S. Application Data

(60) Provisional application No. 61/019,403, filed on Jan. 7, 2008.

(51) Int. Cl.
*B23C 1/12* (2006.01)

(52) U.S. Cl. .......................... 29/26 A; 409/201; 409/211

(58) Field of Classification Search .................. 29/26 A; 409/201, 211, 215, 216; 408/88, 236, 237; *B23C 1/12*
See application file for complete search history.

(56) References Cited

U.S. PATENT DOCUMENTS

| | | | | | |
|---|---|---|---|---|---|
| 3,276,329 | A | * | 10/1966 | Saliba | 409/211 |
| 3,461,750 | A | * | 8/1969 | Brown et al. | 408/56 |
| 3,712,752 | A | * | 1/1973 | Varga | 408/42 |
| 5,238,340 | A | * | 8/1993 | Ochiai et al. | 409/201 |
| 5,807,044 | A | * | 9/1998 | Watari et al. | 409/183 |
| 5,839,862 | A | * | 11/1998 | Hayashi et al. | 409/201 |
| 5,885,037 | A | * | 3/1999 | Heintzeman | 408/1 R |
| 6,045,307 | A | * | 4/2000 | Ikoma et al. | 409/199 |
| 6,447,224 | B2 | * | 9/2002 | Mitsuzono et al. | 409/201 |

FOREIGN PATENT DOCUMENTS

| | | | |
|---|---|---|---|
| DE | 3036995 | A * | 4/1982 |
| DE | 19948335 | C1 * | 7/2001 |
| FR | 2500777 | A * | 9/1982 |
| JP | 59007512 | A * | 1/1984 |

OTHER PUBLICATIONS hand drawn illustration of the assembled invention, drawn by the examiner, Nov. 2010, 1 page.*

* cited by examiner

*Primary Examiner* — Daniel Howell
(74) *Attorney, Agent, or Firm* — John J. Elnitski, Jr.

(57) ABSTRACT

An articulating head that includes a linear movement assembly. There is a pivot plate that includes a first connection point. There is a pivot arm rotatably attached to the pivot plate. The pivot arm has a second connection point. There is a linear movement assembly mounted to and between the first connection point of the pivot plate and the second connection point of the pivot arm to cause rotation of the pivot arm about the pivot plate. The linear movement assembly comprises a threaded rod mounted as a screw, a nut which threads onto the screw and a motor interconnected to one of the screw and nut to cause motion between the screw and the nut. The screw and the nut are mounted between the pivot plate and the pivot arm, whereby the motion induced between the screw and nut causes the pivot arm to rotate about the pivot plate.

18 Claims, 22 Drawing Sheets

ARTICULATING HEAD WITH LINEAR MOVEMENT ASSEMBLY FOR COMPUTER CONTROLLED MILLING MACHINES

This application claims the benefit of and incorporates by reference U.S. Provisional Application No. 61/019,403 filed Jan. 7, 2008.

BACKGROUND

The present invention generally relates to computer controlled machining on computer controlled milling machines. More specifically, the present invention relates to an articulating head used with a computer controlled milling machine to work on a work piece.

The use of an articulating head in the machining of parts is not new to the industry. An articulating head allows mill operators to produce parts of greater complexity. An articulating head allows for additional axis of motion capability to a machine with tools that only support three axes of motion on the machine. An articulating head may be combined with other fixtures such as a rotary table and or tilt table to produce complex parts with relative ease. The current state of the art of articulating heads uses a servo motor driven worm and ring gear as an actuating device to rotate the articulating head. The industry has been faced with the lack of precision when machining parts due to the lack of stability of the actuating device during rotation of the articulating head when machining a part. During machining, current articulating heads can develop lash or free play in the actuating device, which leads to the tool attached to the articulating head becoming inaccurate. As technology moves forward, there will be a demand for greater precision in the machining of parts. Greater precision in the machining parts using an articulating head requires improved stability under the stress of machining and improved control of the rotation of the articulating head and repeatability of the rotation when making parts.

It is an object of the present invention to provide an improved articulating head that employs a precise linear movement assembly to cause rotation of the articulating head.

SUMMARY OF THE INVENTION

An articulating head that includes a linear movement assembly. There is a pivot plate that includes a first connection point. There is a pivot arm rotatably attached to the pivot plate. The pivot arm has a second connection point. There is a linear movement assembly mounted to and between the first connection point of the pivot plate and the second connection point of the pivot arm to cause rotation of the pivot arm about the pivot plate. The linear movement assembly comprises a threaded rod mounted as a screw, a nut which threads onto the screw and a motor interconnected to one of the screw and nut to cause motion between the screw and the nut. The screw and the nut are mounted between the pivot plate and the pivot arm, whereby the motion induced between the screw and nut causes the pivot arm to rotate about the pivot plate.

DETAILED DESCRIPTION

Figure 1:
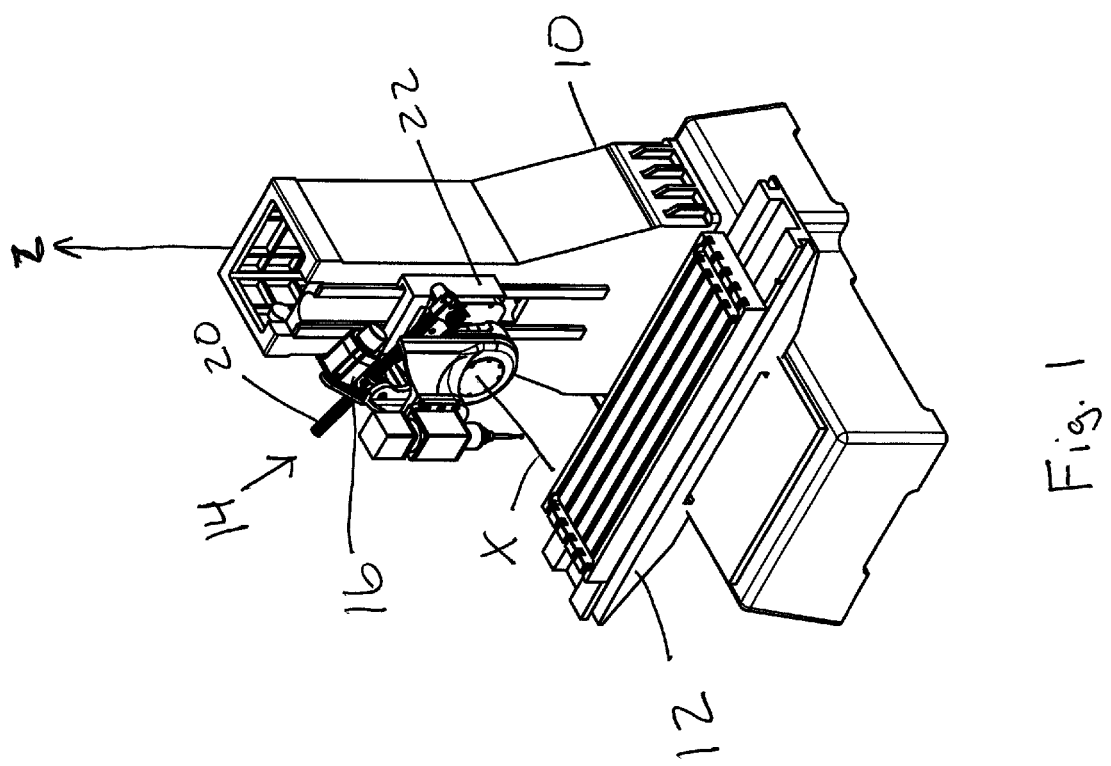
FIG. 1 is a perspective view of an articulating head with a linear movement assembly that is mounted to a CNC machine according to the present invention.
Figure 2:
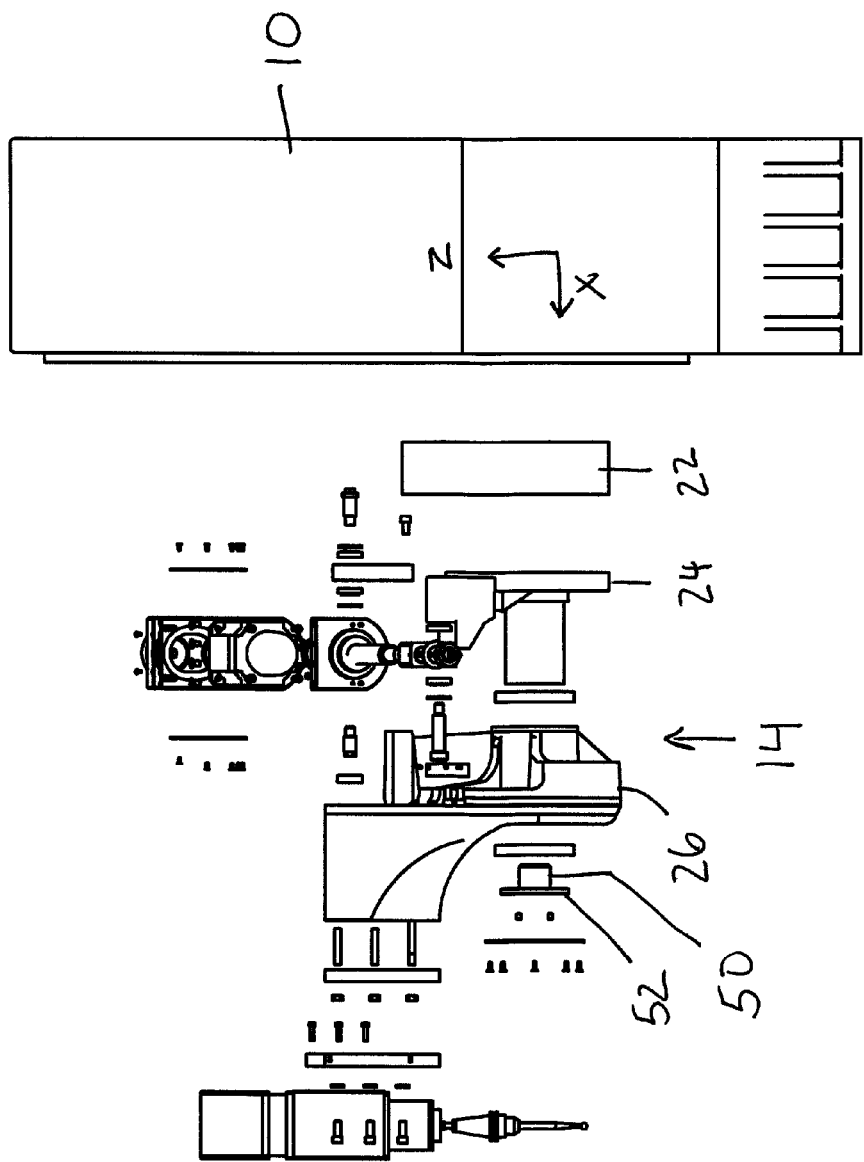
FIG. 2 is a side exploded view of the articulating head with a linear movement assembly of FIG. 1 according to the present invention.
Figure 3:
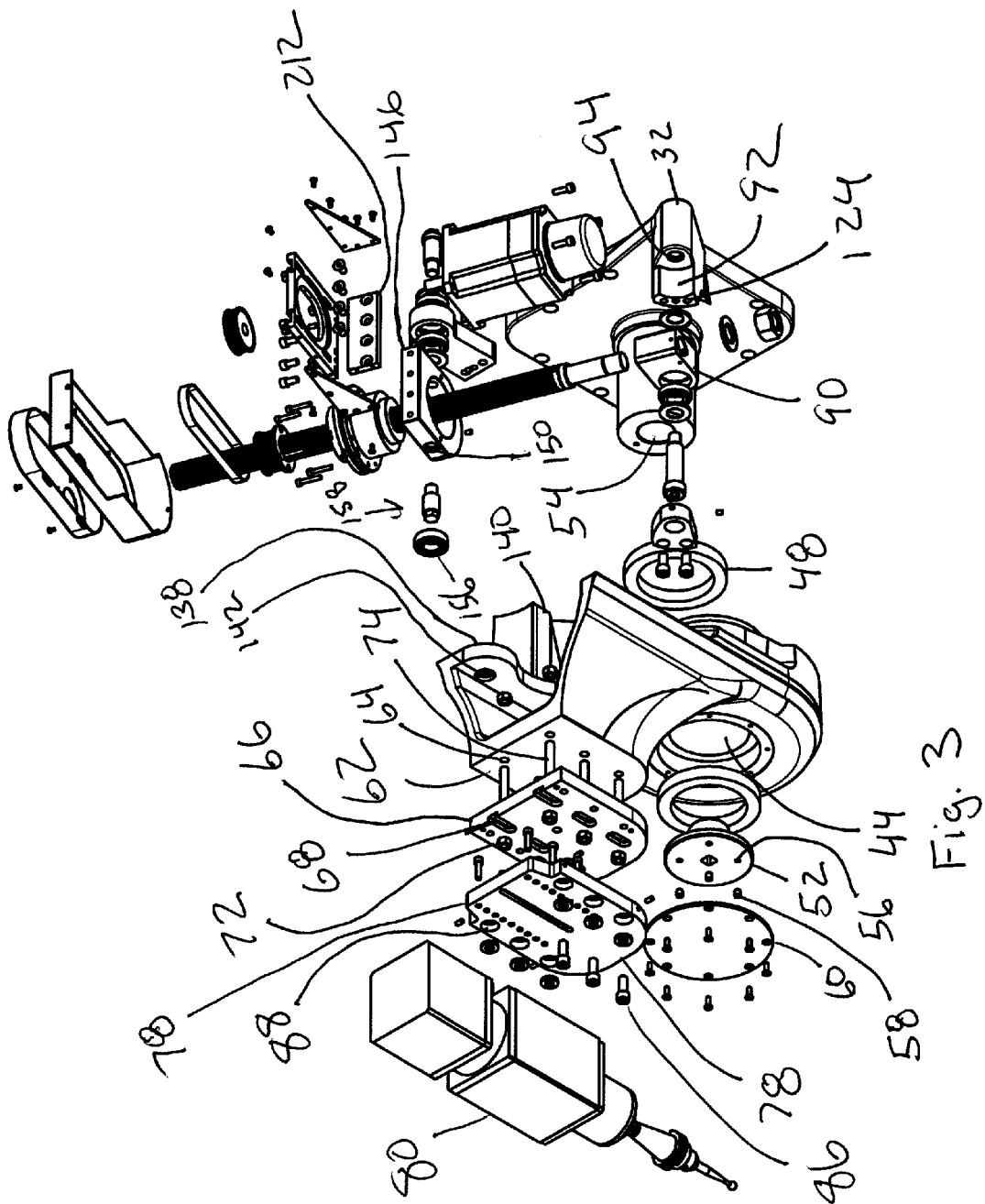
FIG. 3 is a right front side exploded perspective view of the articulating head with a linear movement assembly of FIG. 1 according to the present invention.
Figure 4:
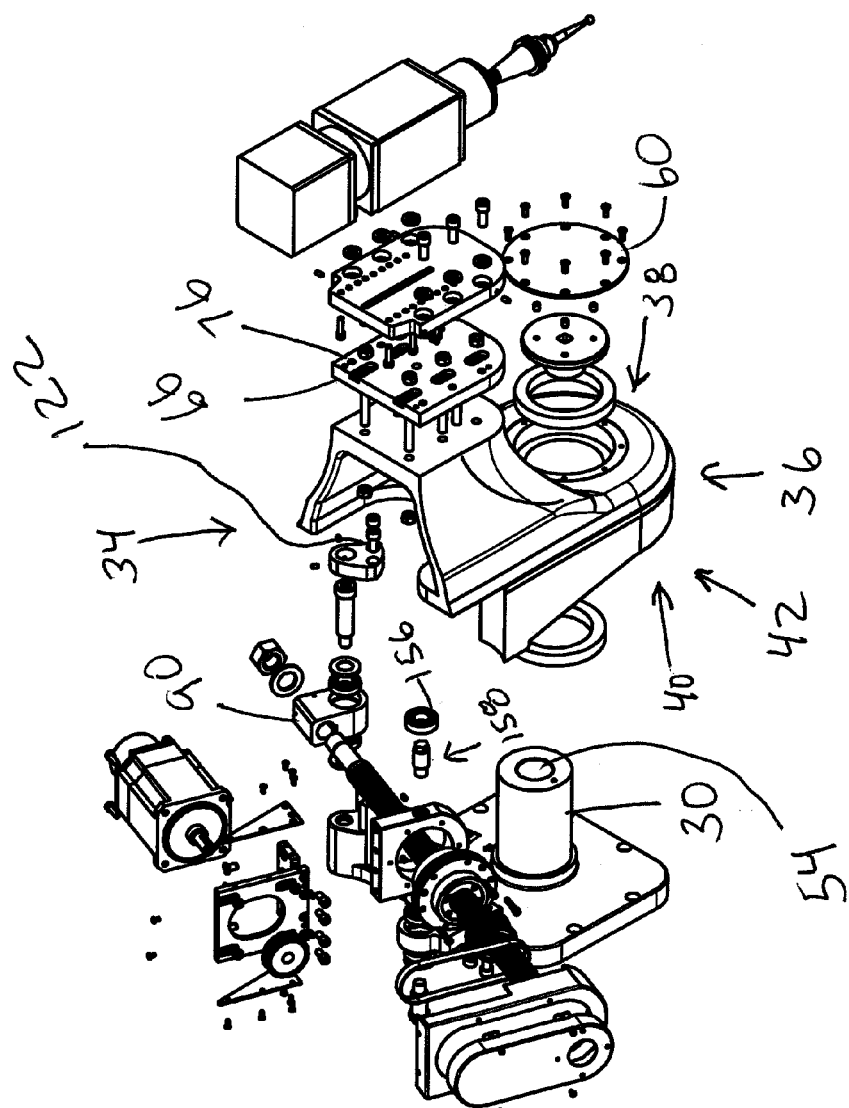
FIG. 4 is a left front side exploded perspective view of the articulating head with a linear movement assembly of FIG. 1 according to the present invention.
Figure 5:
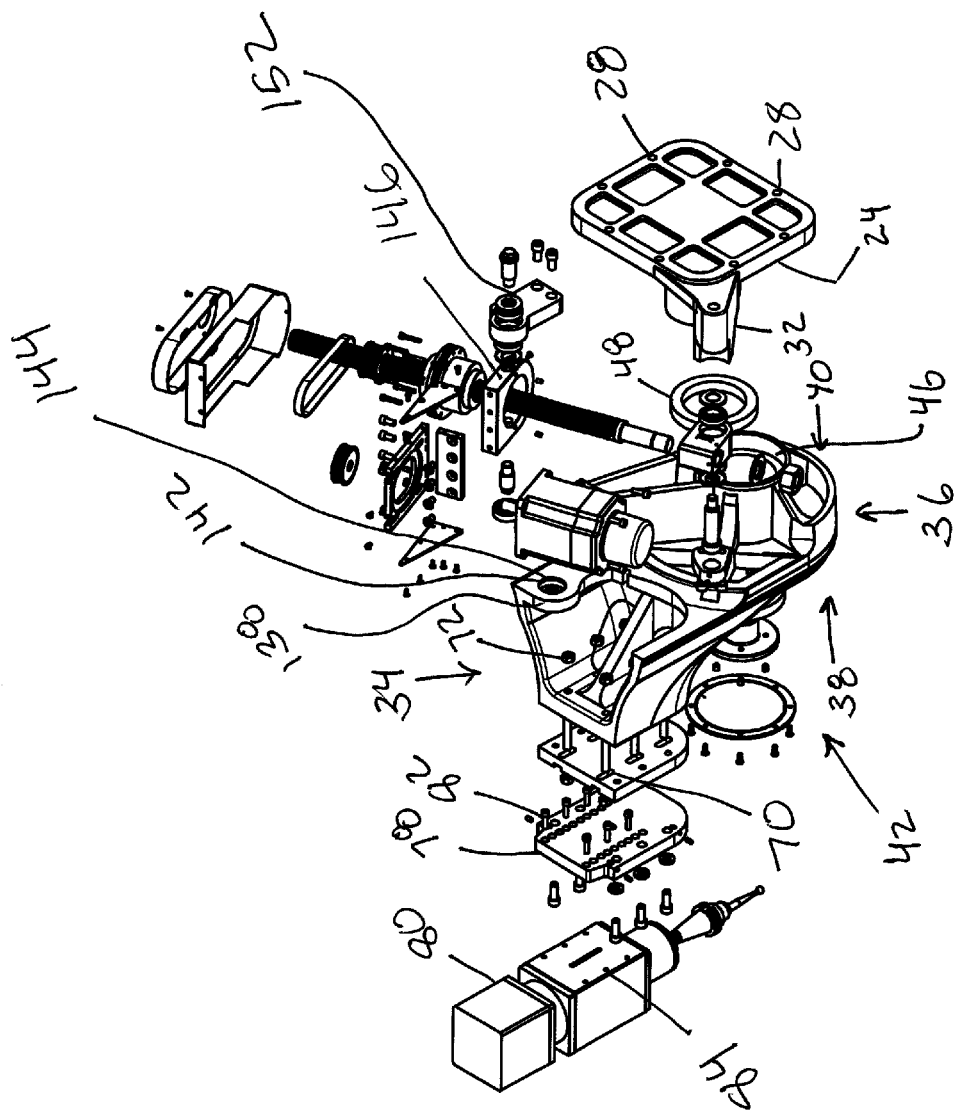
FIG. 5 is a right rear side exploded perspective view of the articulating head with a linear movement assembly of FIG. 1 according to the present invention.
Figure 6:
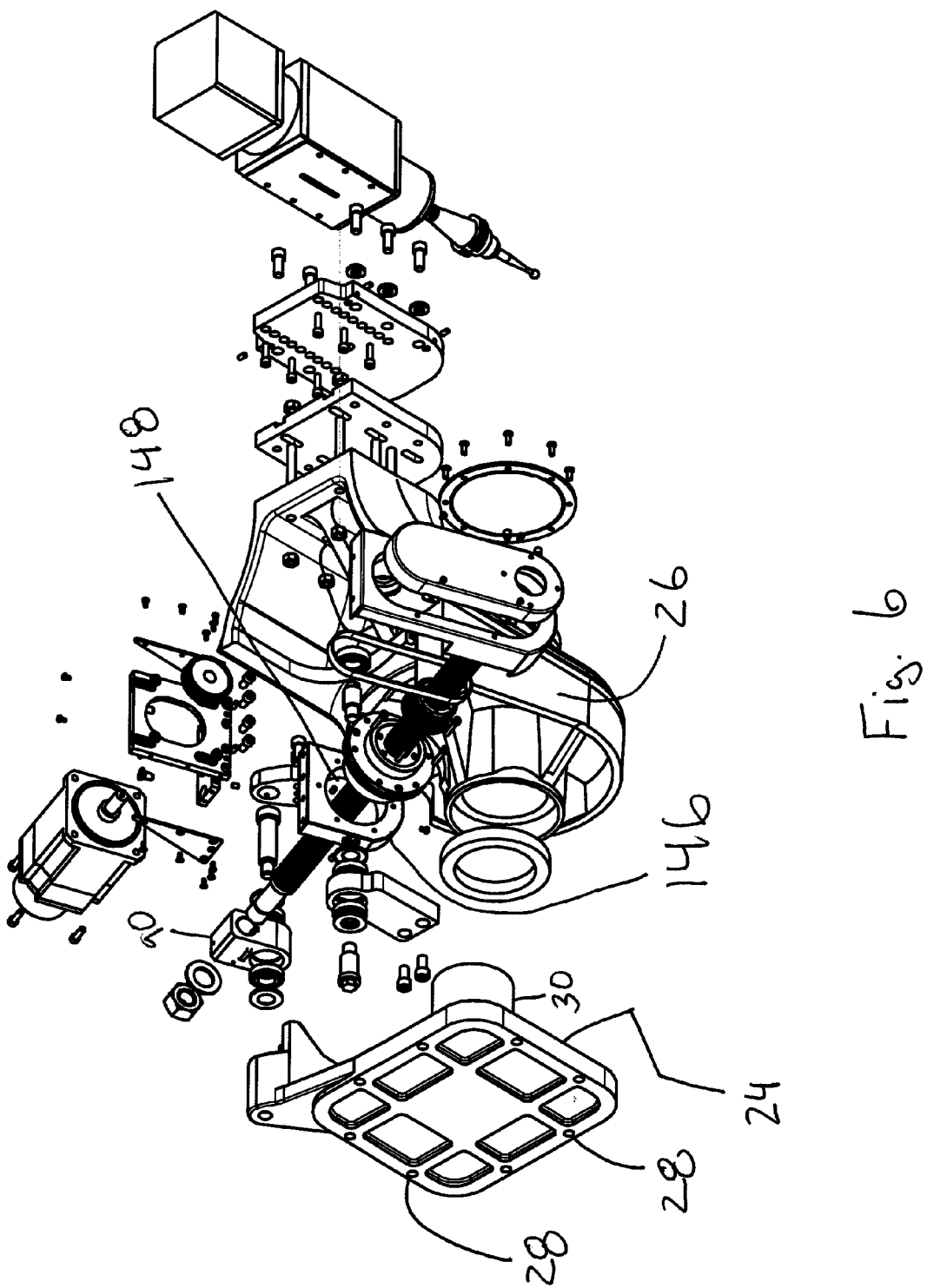
FIG. 6 is a left rear side exploded perspective view of the articulating head with a linear movement assembly of FIG. 1 according to the present invention.

The present invention is an articulating head with linear movement assembly to be used as part of a computer controlled milling machine. FIG. 1 shows a computer controlled (CNC) milling machine 10 that uses milling tools to machine a work piece from a work table 12. The articulating head 14 is shown attached to the machine 10. The articulating head 14 moves in a linear motion Z axis along the machine 10, but rotates about an axis X, which is perpendicular to the linear motion Z axis. The main components of the liner movement assembly are a servo motor 16, a motion nut 18 and a screw 20 shown as a threaded rod. The screw 20 and the motion nut 18 are shown as a ball screw and ball nut, which is one of the most precise combinations of a screw and nut that are available. A precision computer controlled motor such as a servo motor is used as the motor 16 so that it can be controlled to provide precision positioning of the nut 18 along the screw 20 during machining and can be also used to hold the nut 18 and screw in a stopped position during machining. The linear movement assembly is an actuating device for the articulating head 14 that provides a precise linear motion which is converted into a precise rotation motion of the articulating head 14, due to the connection points between the linear movement assembly and the articulating head 14. The linear motion of the linear movement assembly is precise and avoids the pitfalls of current actuating devices used with articulating heads. FIG. 1 shows the articulating head 14 attached to a movement plate 22. The movement plate 22 is moved by the machine 10 in a linear motion along the Z axis. FIGS. 2-6 show the articulating head 14 including a pivot plate 24 and a pivot arm 26, as the main components of the articulating head 14. The pivot plate 24 attaches to the movement plate 22. The pivot plate 24 acts as the base for the articulating head 14 and the movement plate 22 is the interface between the articulating head 14 and the machine 10. The pivot plate 24 includes mounting holes 28 for fastening the pivot plate 24 to the movement plate 22, as shown in FIGS. 5-6. The pivot plate 24 includes a bearing boss 30 for the pivot arm 26 to rotate about during machining operations, where the center of the bearing boss 30 acts as the point of rotation for the pivot arm 26, as shown in FIGS. 3-4. The pivot plate 24 includes a screw arm 32 for mounting of the linear movement assembly, as shown in FIGS. 3 and 5.

The pivot arm 26 acts as a base for mounting tools to the articulating head 14. The pivot arm 26 includes top 34, bottom 36, front 38, rear 40 and sides 42, as shown in FIGS. 4-5. The pivot arm 26 includes a bearing boss hole 44, which is a through hole from rear 40 to front 38 near the bottom 36 of the pivot arm 26. The rear 40 of the pivot arm 26 includes a bearing cavity 46 about the bearing boss hole 44 to receive a bearing 48. The front 38 of the pivot arm 26 includes a bearing cavity 46 about the bearing boss hole 44 to receive a bearing 48. The bearings 48 are typically pressed into the bearing cavity 46 of the front 38 and rear 40 of the pivot arm 26. Pivot arm 26 is mounted to the pivot plate 24 by sliding the pivot arm 26 over the bearing boss 30 with the bearings 48 installed, so that the bearing boss 30 inserts into the bearings 48 and the bearing boss hole 44. The pivot arm 26 can rotate about the bearing boss 30 due to the bearings 48 rolling about the bearing boss 30. The pivot arm 26 includes a bearing tensioner. The bearing tensioner includes a threaded stud 50 and tension plate 52. The bearing boss 30 includes a threaded hole 54 in the front of the bearing boss 30. The threaded stud 50 of the bearing tensioner threads into the threaded hole 54 of the bearing boss 30. The threaded stud 50 enters the bearing boss 30 from the front 38 of the pivot arm 26 and through the bearing 48 in the front 38 of the pivot arm 26. The tension plate 52 contacts the bearing 48 in the front 38, whereby the more the bearing tensioner is threaded into the bearing boss 30, the more of a load is put on the bearings 48 in the front 38 and rear 40 of the pivot arm 26. The tension plate 52 can include a socket hole (not shown) to allow a tool to tighten or loosen the bearing tensioner in the bearing boss 30. The bearing tensioner is used to secure the pivot arm 26 to the pivot plate 24. The tension plate 52 includes threaded set screw holes 56. Set screws 58 are threaded into the tension plate 52 and against the front of the bearing boss 30 to prevent rotation of the bearing tensioner. The pivot arm 26 includes a protective plate 60 which covers the front 38 in the area of the bearing boss hole 44, the bearing 48 and the tension plate 52.

FIGS. 3-6 show one of many examples of mounting a tool to the pivot arm 26. The pivot arm 26 includes a tool mounting section 62 near the front 38 and top 34 of the pivot arm 26. The pivot tool mounting section 62 is shown as a flat face with holes 64. An adjustable mounting plate 66 is shown with slotted holes 68, nut channels 70 and nuts 72. The slotted holes 68 are positioned within the nut channels 70. The nut channels 70 are for receiving nuts 72 to be attached to studs 74. The adjustable mounting plate 66 is fastened to the flat face of the pivot tool mounting section 62 using the studs 74, the holes 64 of the flat face, the slotted holes 68 and the nuts 72 on both sides of the studs 74. The slotted holes 68 allow for adjusting the mounting position of the adjustable mounting plate 66 to the pivot arm 26. The adjustable mounting plate 66 includes threaded holes 76. FIGS. 3 and 6 show a tool mounting plate 78 which is secured to a tool 80 using bolts 82 and threaded holes 84 in the tool 80. The tool mounting plate 78 with the tool 80 is secured to the adjustable mounting plate 66 using bolts 86, holes 88 on the tool mounting plate 78 and the threaded holes 76 of the adjustable mounting plate 66. The tool 80 shown is a probe, which is one of many passive and active tools that are used with an articulating head and is shown for example only. Typical tools used with an articulating head are cutting tools and measurement tools, but there are other types of tools used with articulating heads that performed different applications.

Figure 7:
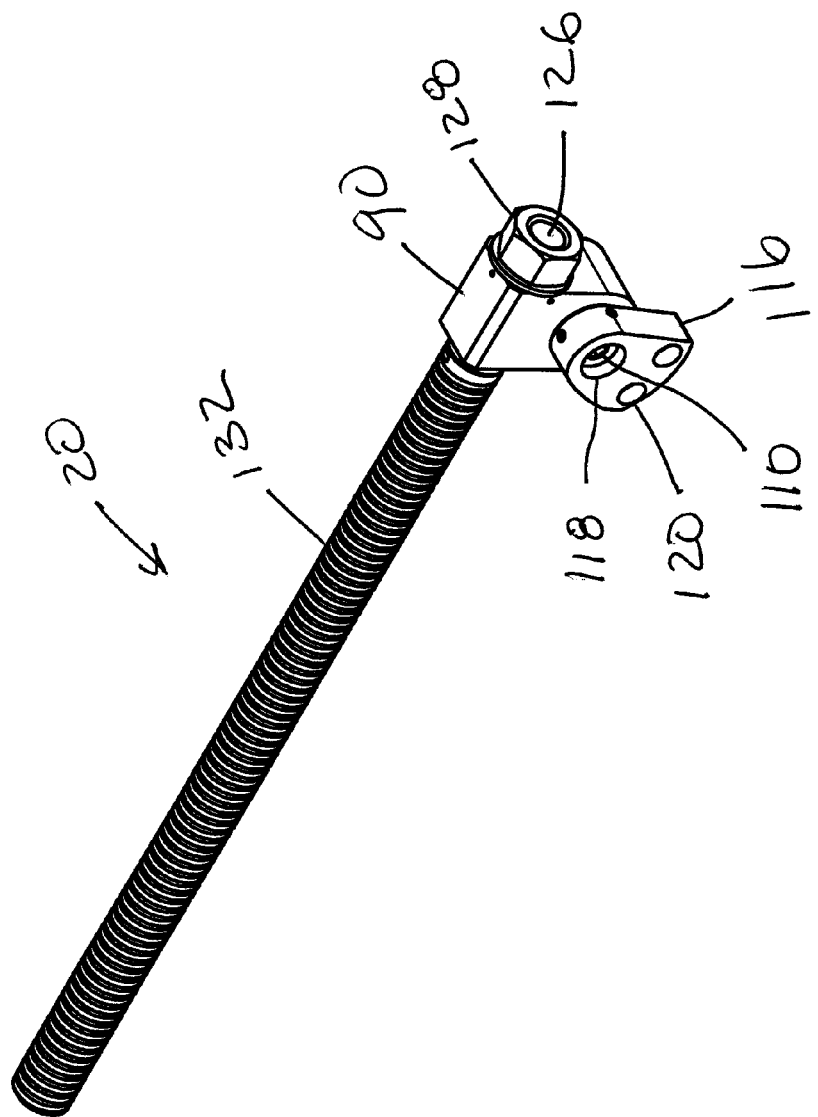
FIG. 7 is a perspective view of a screw and screw mounting according to the present invention.
Figure 8:
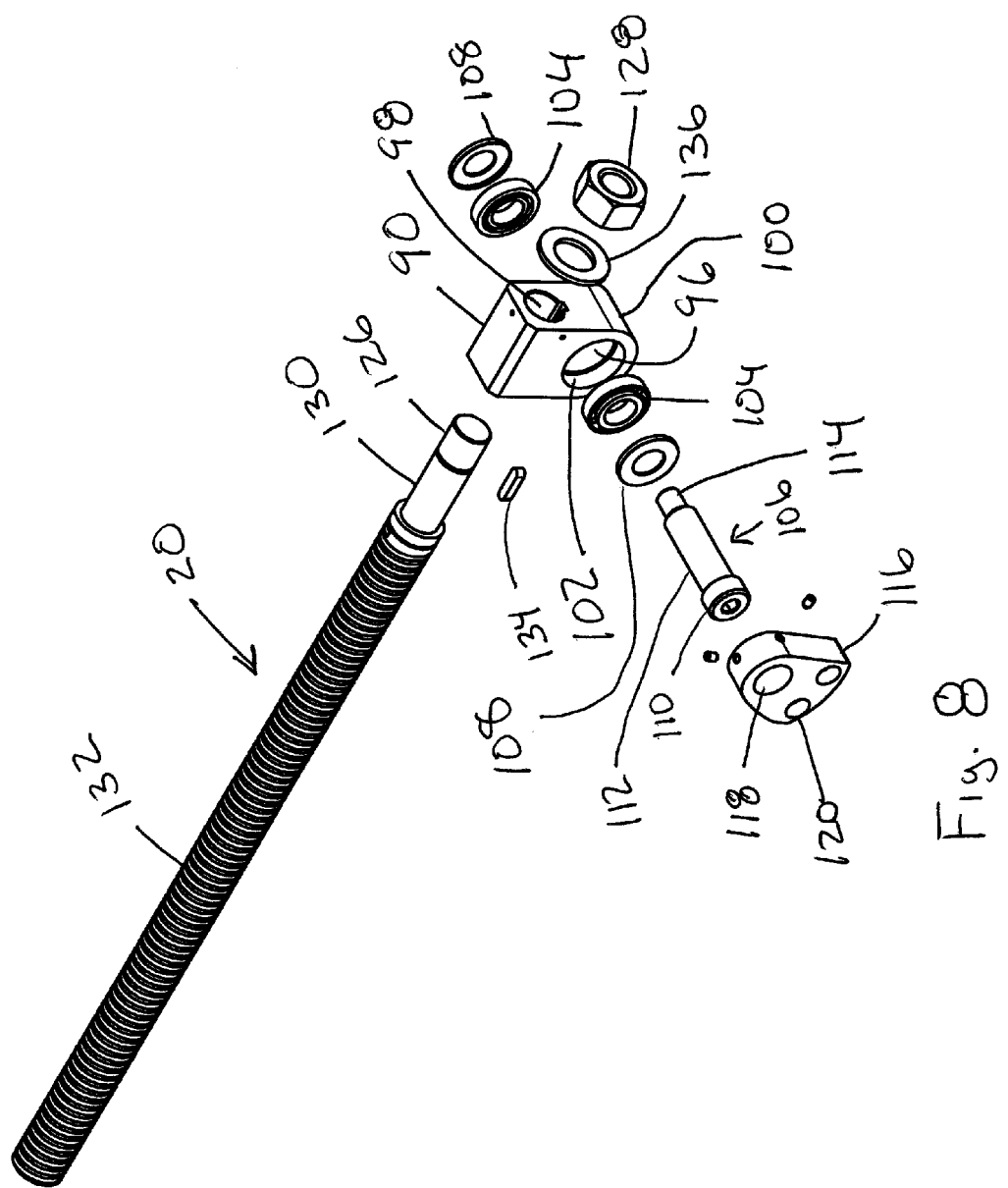
FIG. 8 is an exploded perspective view of a screw and screw mounting according to the present invention.

FIGS. 3-16 show the components of the linear movement assembly. The linear movement assembly has two connection points. The first connection point is at a screw mount 90 that attaches to the screw mount arm 32 of the pivot plate 24, as shown in FIG. 3. The screw mount arm 32 includes a rounded receiving area 92 and a threaded bolt hole 94. The screw mount 90 includes a mounting through hole 96 and a screw through hole 98, as shown in FIG. 8. The screw mount 90 includes a rounded bottom 100 to fit within the rounded receiving area 92 of the screw mount arm 32. The mounting through hole 96 includes bearing cavities 102 on each side of the screw mount 90 to receive bearings 104. A shoulder bolt 106 is used that is inserted into the washers 108, bearings 104 and mounting through hole 96 to secure the screw mount 90 to the screw mount arm 32, as shown in FIG. 4. As with all shoulder bolts described herein, the shoulder bolt 106 has a head 110, shoulder 112 to provide a rotation surface with bearings and a threaded end 114 for attachment, whereby the shoulder bolt is used as a bearing mount. The threaded end 114 of the shoulder bolt 106 threads into the threaded bolt hole 94 of the screw mount arm 32 to secure the screw mount 90 to the screw mount arm 32. The screw mount 90 is secured such that it rotates about the shoulder bolt 106 on the bearings 104. This ability of the screw mount 90 to rotate provides a freedom of movement at the screw mount arm 32 to allow the screw mount 90 to move as needed during use of the linear movement assembly. A support bracket 116 is used to support the head 110 of the shoulder bolt 106. The support bracket 116 includes a head hole 118 and two bolt holes 120. The head hole 118 is large enough to receive the head 110 of the shoulder bolt 106. The screw mount arm 32 includes two bolts 122 that are inserted into the bolt holes 120 of the support bracket 116 and are threaded into threaded bolt holes 124 in the screw mount arm 32, in order to secure the support bracket 116 to the screw mount arm 32.

A first end of the screw 20 includes a threaded end 126 to receive a retaining nut 128 and includes a shoulder 130 before the main threads 132 of the screw 20 that interact with the motion nut 18. The first end of the screw 20 is inserted into the screw through hole 98 of the screw mount 90. The screw 20 is inserted such that the threaded end 126 extends out from the screw through hole 98 and the shoulder 130 lies in the screw through hole 98 of the screw mount 90. The screw through hole 98 and the shoulder 130 of the screw 20 each include a key way. A key 134 is inserted with the screw 20, such that the key 134 is retained in both key ways to prevent the screw 20 from rotating. A washer 136 is placed on the threaded end 126 of the screw 20 and the retaining nut 128 is threaded onto the threaded end 126 of the screw 20 to secure the screw 20 to the screw mount 90, as shown in FIGS. 7-8.

Figure 9:
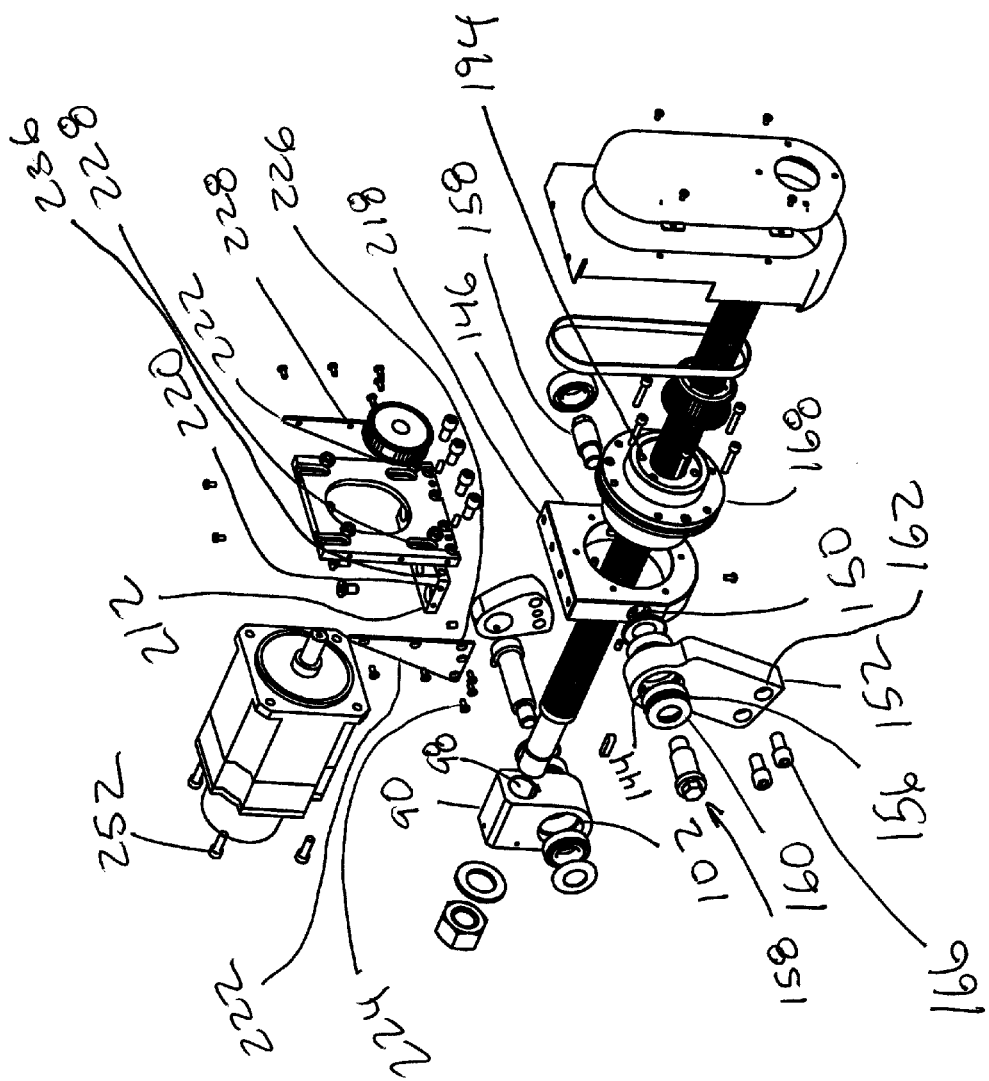
FIG. 9 is a perspective view of a linear movement assembly according to the present invention.
Figure 10:
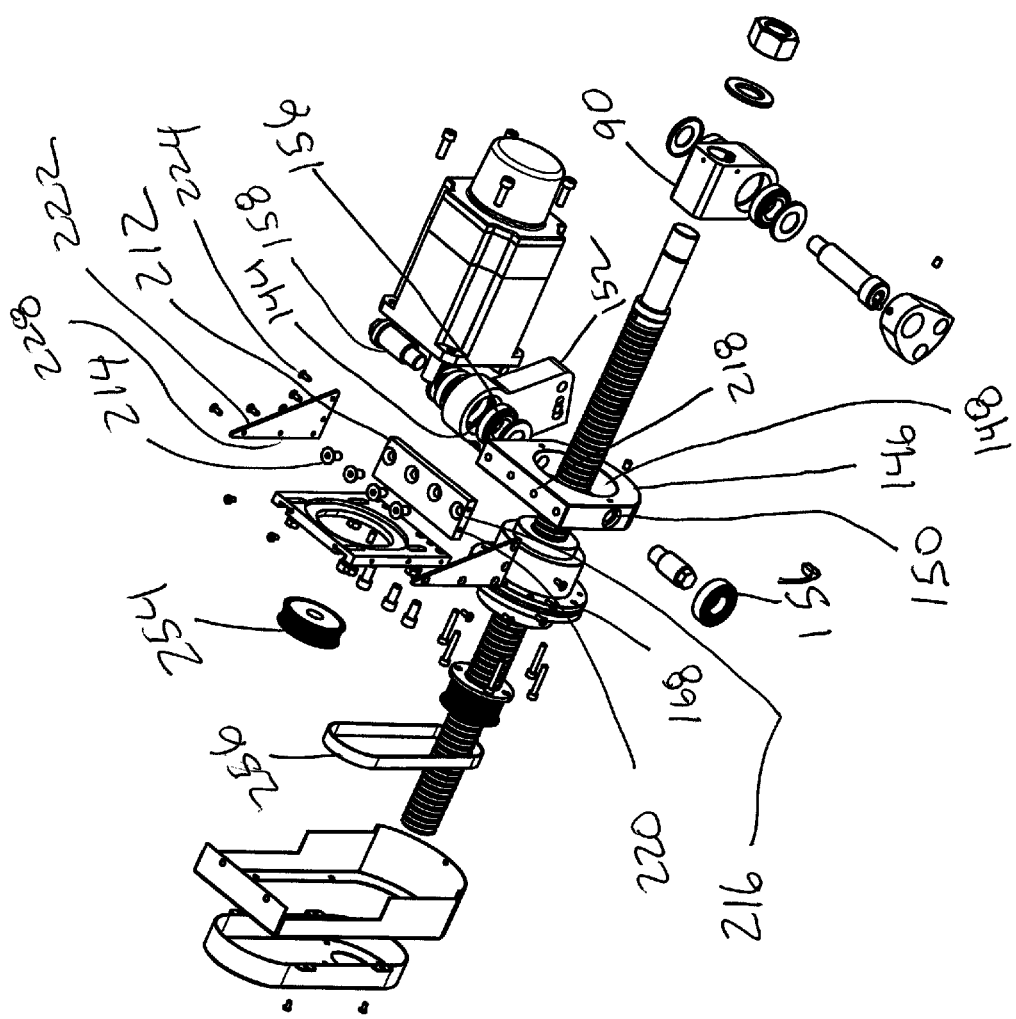
FIG. 10 is another perspective view of a linear movement assembly according to the present invention.
Figure 11:
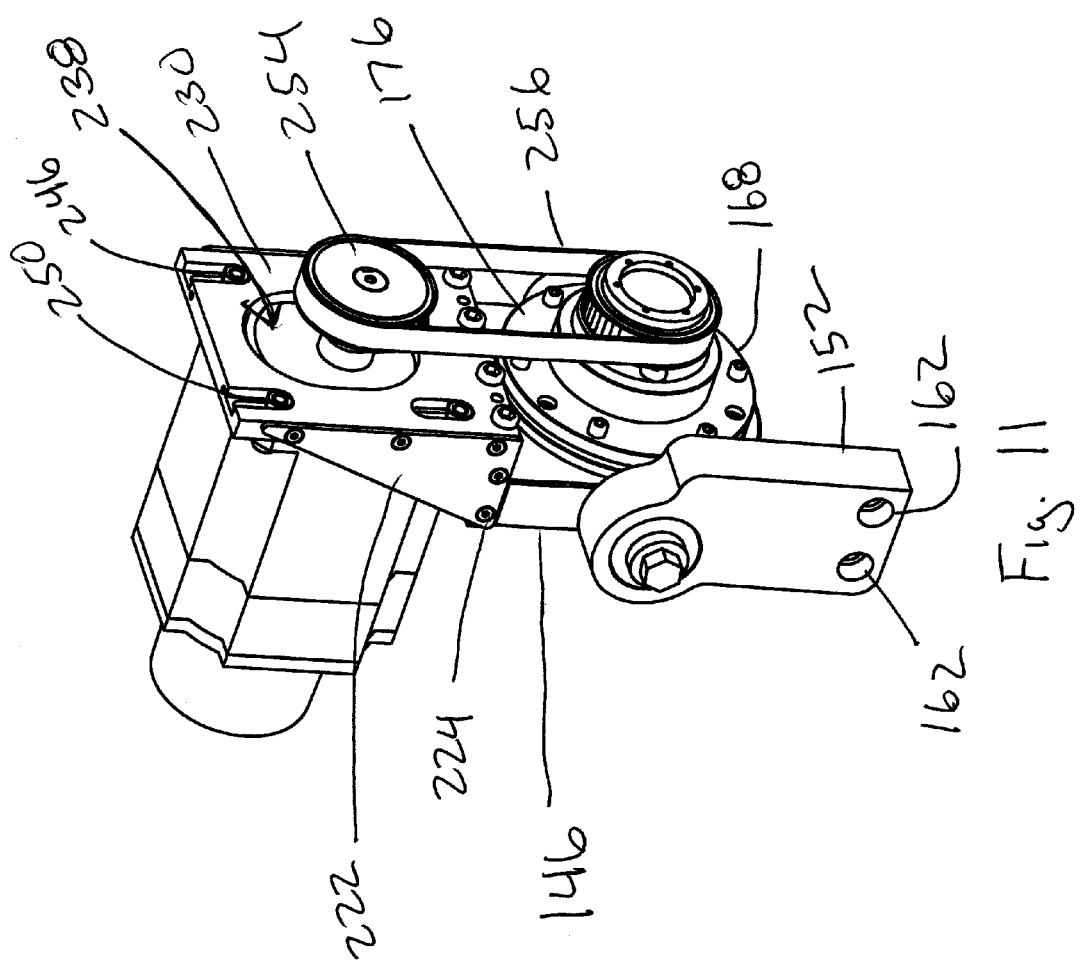
FIG. 11 is a perspective view of a motor and pulley assembly according to the present invention.
Figure 12:
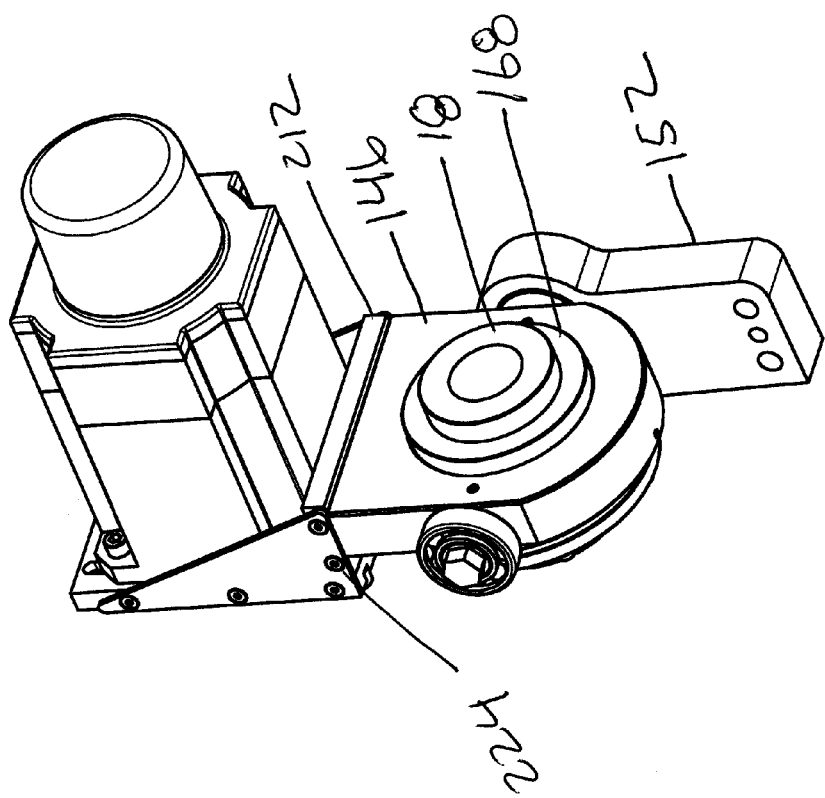
FIG. 12 is another perspective view of a motor and pulley assembly according to the present invention.

The second connection point of the linear movement assembly is on the rear 40 of the pivot arm 26, near the top 34, as shown in FIG. 5. The pivot arm 26 includes a lug 138 with a screw mount shoulder 140. The lug 138 has a shoulder bolt hole 142 that includes a bearing cavity 144. The screw mount shoulder 140 includes a rounded receiving area. A motion nut mount 146 is shown in FIGS. 9-10. The motion nut mount 146 includes a rounded bottom that interacts with the rounded receiving area of the screw mount shoulder 140. The motion nut mount 146 includes a motion nut hole 148. The motion nut mount 146 includes a threaded shoulder bolt hole 150 on each side of the motion nut mount 146. A removable lug 152 is used to secure the motion nut mount 146 to the pivot arm 26. The removable lug 152 includes a shoulder bolt hole 154 with a bearing cavity 144 on each side of the shoulder bolt hole 154 of the removable lug 152. Bearings 156 are used in the bearing cavities 144 of the lug 138 on the pivot arm 25 and the bearing cavities 144 of the removable lug 152. A shoulder bolt 158 is used with the lug 138 of the pivot arm 26, whereby the head 110 of the shoulder bolt 158 rests in the shoulder bolt hole 142 of the lug 138. A shoulder bolt 158 is used with the removable lug 152 along with a washer 160. The threaded end 114 of the shoulder bolts 158 are threaded into the threaded shoulder bolt holes 150 of the motion nut mount 146. The removable lug 152 includes two bolt holes 162 for mounting the motion nut mount 146 to the pivot arm 26. The pivot arm 26 includes two threaded bolt holes (not shown) near the lug 138 to allow mounting of the motion nut mount 146 to the pivot arm 26. The motion nut mount 146 is secured to the pivot arm 26 using two bolts 166, the two bolt holes 162 and the two threaded bolt holes 164. The motion nut mount 146 is secured such that motion nut mount 146 can rotate about the shoulder bolts 158 on the bearings 156. This ability of the motion nut mount 146 to rotate provides a freedom of movement to allow the motion nut mount 146 to move as needed during use of the linear movement assembly.

Figure 13:
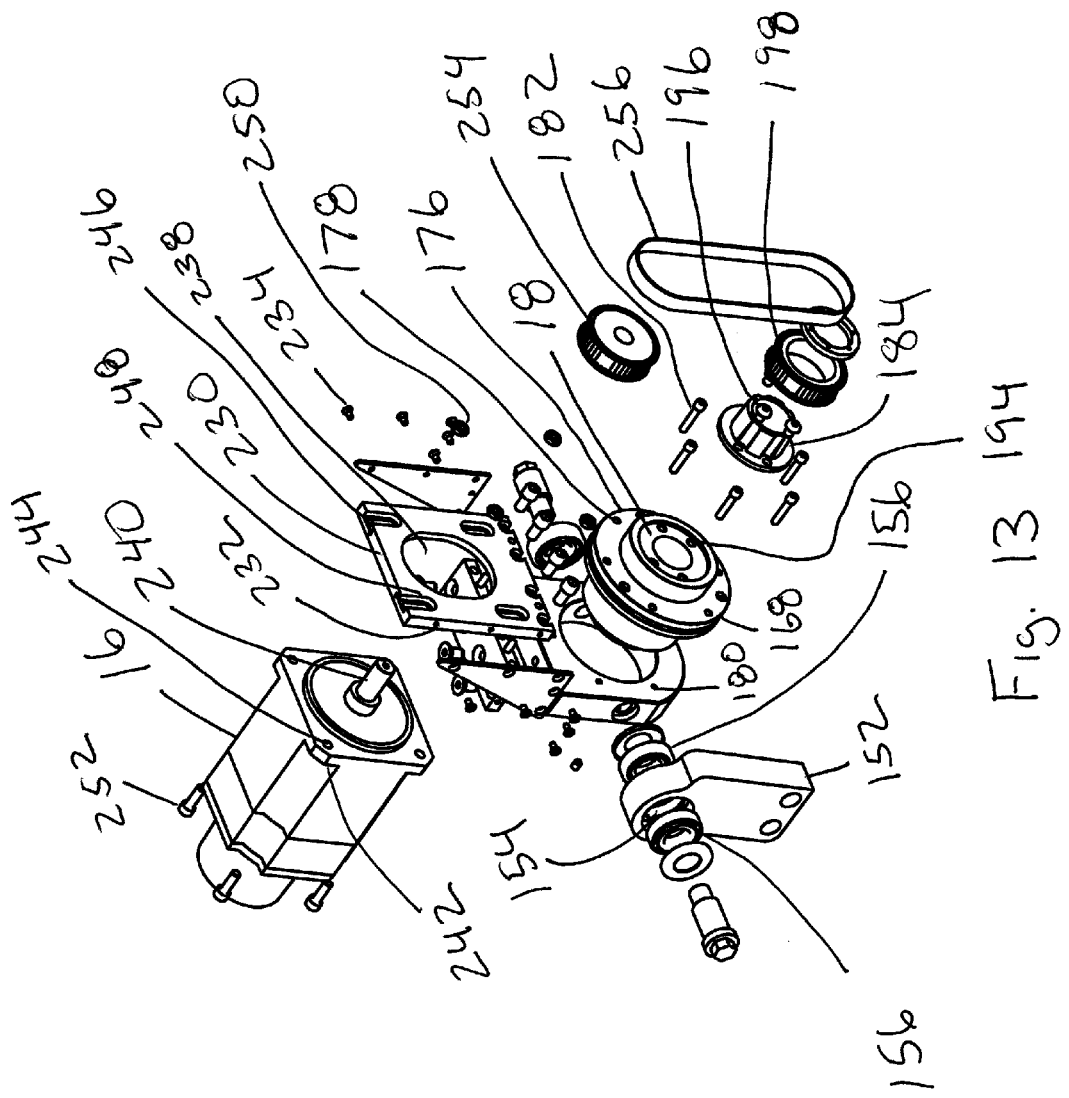
FIG. 13 is an exploded perspective view of a motor and pulley assembly according to the present invention.
Figure 14:
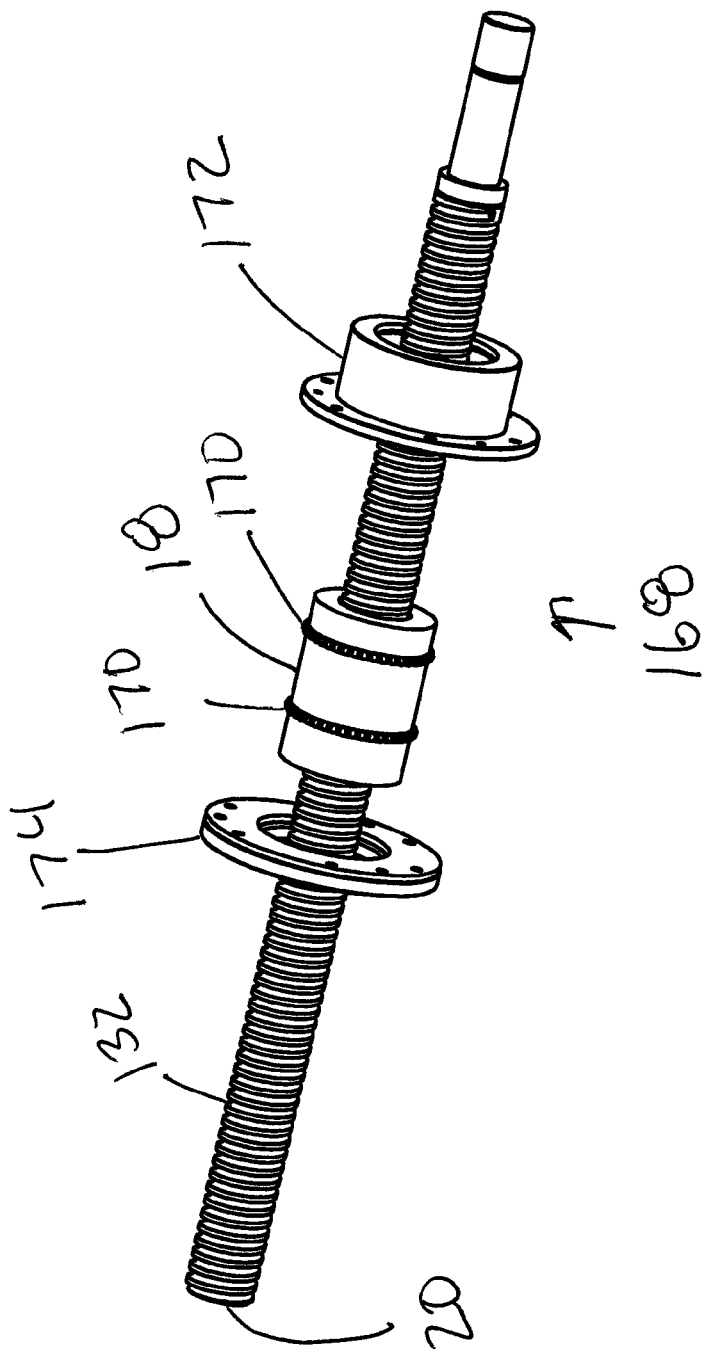
FIG. 14 is an exploded perspective view of a motion nut housing according to the present invention.
Figure 15:
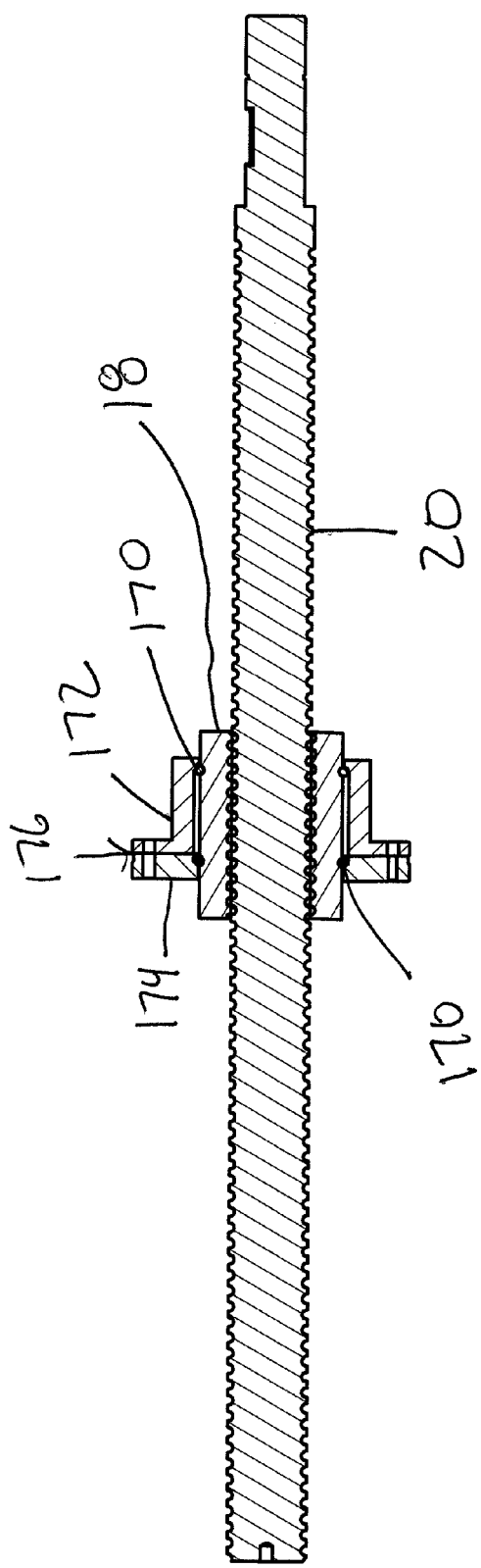
FIG. 15 is a cut-a-way side view of a motion nut housing according to the present invention.
Figure 16:
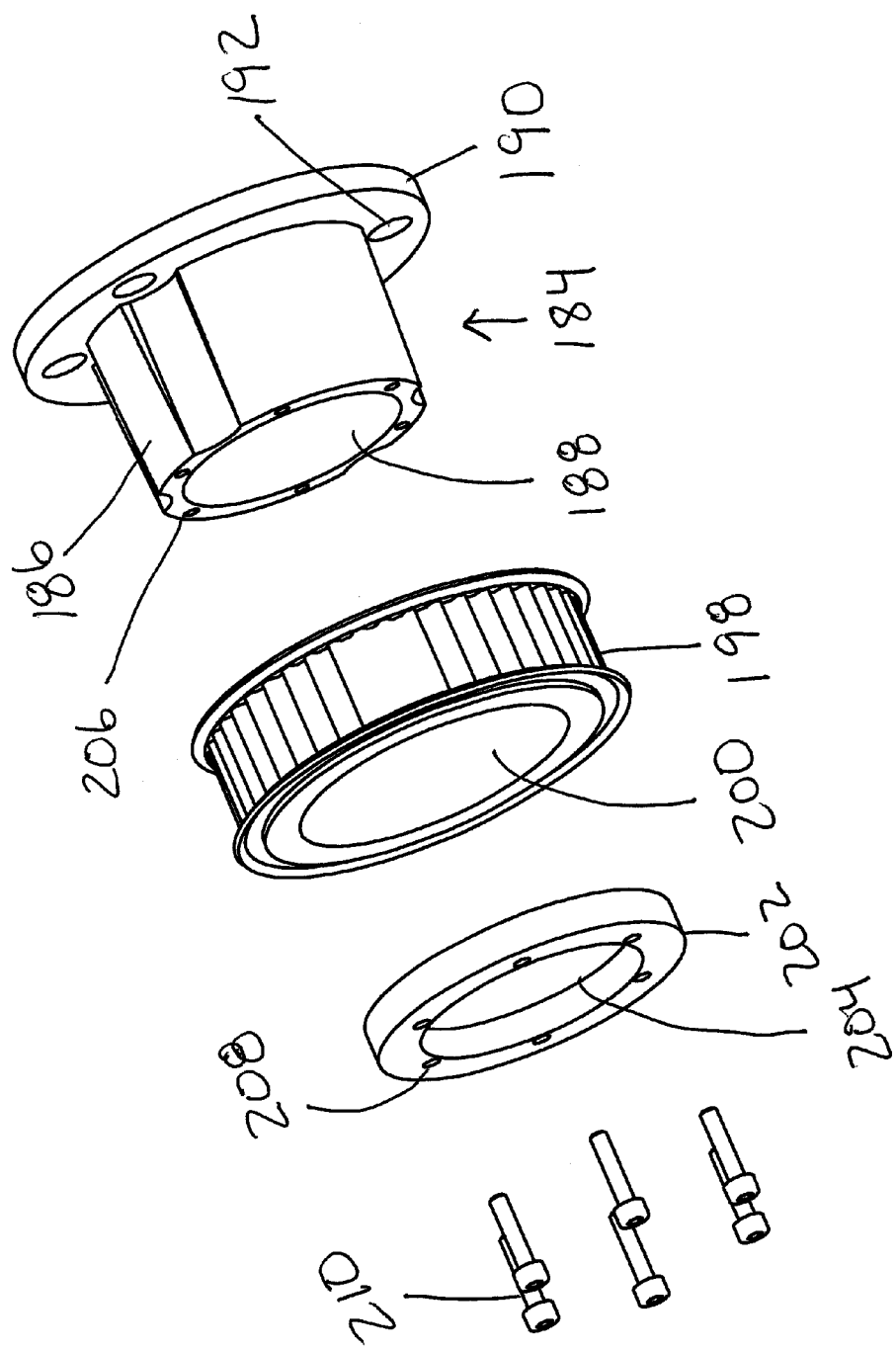
FIG. 16 is an exploded perspective view of a motion nut pulley assembly according to the present invention.

The motion nut 18 is shown in FIGS. 9-15. The motion nut 18 includes motion nut housing 168 and ball bearings 170. The motion nut housing 168 includes a main body 172 and a retaining plate 174. The motion nut 18 fits into the main body 172 of the motion nut housing 168 and the retaining plate 174 is attached to the main body 172 over the motion nut 18 to secure the motion nut 18 in the motion nut housing 168. Ball bearings 170 are used to allow the motion nut 18 to spin freely in the motion nut housing 168. The motion nut housing 168 includes a collar 176 about the motion nut housing 168. The collar 176 includes bolt holes 178 that match up with threaded bolt holes 180 around the motion nut hole 148 in the motion nut mount 146. Part of the motion nut housing 168 is mounted in the motion nut hole 148 using bolts 182, the bolt holes 178 of the collar 176 and the threaded bolt holes 180 of the motion nut mount 146, as shown in FIGS. 9-13. FIGS. 13 and 16 show a motion nut pulley mount 184 that includes a tapered boss 186, screw hole 188 in the tapered boss 186 and a pulley mount collar 190. The motion nut pulley mount 184 is attached to the motion nut 18 directly, so that both the motion nut 18 and the motion nut pulley mount 184 move together. The pulley mount collar 190 includes bolt holes 192 that match up with threaded bolt holes 194 on the motion nut 28. The motion nut pulley mount 184 is mounted to the motion nut 18 by first sliding a second end of the screw 20 through the screw hole 188 of the motion nut pulley mount 184 and then attaching the pulley mount collar 190 of the motion nut pulley mount 184 to the motion nut 18 using bolts 196, the bolt holes 192 and the threaded bolt holes 194.

FIGS. 13 and 16 show a motion nut pulley 198 that includes a boss hole 200. The motion nut pulley 198 slides over the screw 20 and onto the boss 186 of the motion nut pulley mount 184. The motion nut pulley 198 is pressed onto the boss 186 and a retainer 202 with a boss hole 204 is pressed onto the boss 186 to retain the motion nut pulley 198 in place. The motion nut pulley mount 184 includes threaded bolt holes 206 on the end of the boss 186, as shown in FIG. 16. The retainer 202 includes bolt holes 208, as shown in FIG. 16. The retainer 202 bolts to the boss 186 using bolts 210, bolt holes 208 and threaded bolt holes 206. The retainer 202 is large enough to come in contact with the motion nut pulley 198 and retain the motion nut pulley 198 on the boss 186 of the motion nut pulley mount 184.

A motor mount plate 212 is shown in FIGS. 3 and 9-10. A motor mount plate 212 is attached to a top of the motion nut mount 146 using bolts 214, holes 216 in the motor mount plate 212 and threaded holes 218 on the top of the motion nut mount 146. The motor mount plate 212 includes threaded holes 220 on two sides of the motor mount plate 212. A side support 222 is attached to each side of the motor mount plate 212 that has the threaded holes 220 by using bolts 224 and bolt holes 226 in the bottom of the side supports 222. The side supports 222 also include motor mount bolt holes 228 for a motor mount 230. The motor mount 230 is shown in FIGS. 9-11 and 13. The motor mount 230 includes threaded holes 232 along the side of the motor mount 230 for attachment to the side supports 222 using bolts 234 and the motor mount bolt holes 228. The motor mount 230 includes motor mount bolt holes 228 for attachment of the motor mount 230 to the motor mount plate 212 using threaded bolt holes 236 in the motor mount plate 212 and bolts 234. The combination of the motion nut mount 146, motor mount plate 212, support sides 222 and motor mount 230 provides a platform to attach the motor 16. The motor mount 230 includes a shaft hole 238 to allow passage of a shaft 240 of the motor 16. Motor 16 includes mounting lugs 242 that each have a bolt hole 244 that match ups with bolt holes 246 around the shaft hole 238 of the motor mount 230. The motor mount 230 includes nut channels 248 to receive nuts 250, whereby the bolt holes 246 around the shaft hole 238 are positioned within the nut channels 248. The nut channels 248 are for receiving the nuts 250 when securing the motor 16 to the motor mount 230. The motor 16 is secured to the motor mount 230 using bolts 252, bolt holes 244 of the mounting lugs 242, bolt holes 246 in the nut channels 248 and nuts 250. A motor pulley 254 is mounted to the shaft 240 of the motor 16. A belt 256 is mounted about the motor pulley 254 and the motion nut pulley 198.

Rotation of the motor pulley 254 by the motor 16 causes the motion nut pulley 198 to rotate. Rotation of the motion nut pulley 198 causes the motion nut 18 to rotate about the screw 20. As the motion nut 18 rotates about screw 20, the motion nut 18 moves along the screw 20 in linear motion. Direction of movement along the screw 20 by the motion nut 18 depends on the direction of rotation of the motion nut 18. Whereby, the motor 16 is equipped with the ability to rotate the motor shaft 240 in either direction and hence the motor pulley 254 in either direction about the shaft 240. When the motion nut 18 moves along the screw 20, the pivot arm 26 rotates about the pivot plate 26 in a direction that depends on the direction of rotation of the motion nut 18. The pivot arm 26 rotates due to the interconnections at the first connection point and the second connection point. Where at the first connection point, the screw 20 is fixed to the pivot plate 24, but can move due to the freedom of movement at the first connection point and where at the second connection point the motion nut 18 is fixed to the pivot arm 26, but can move due to the freedom of movement at the second connection point. The use of the screw 20 and motion nut 18, especially when a ball screw and ball nut is used, provides a very precise movement assembly which avoids the pitfalls of current methods used to rotate an articulating head. Also note that for the embodiment shown in the FIGS. 1-16, the freedom of movement for the second connection point is in the same plane as the center line between the first end and second end of the screw 20 to form a more efficient design.

Figure 17:
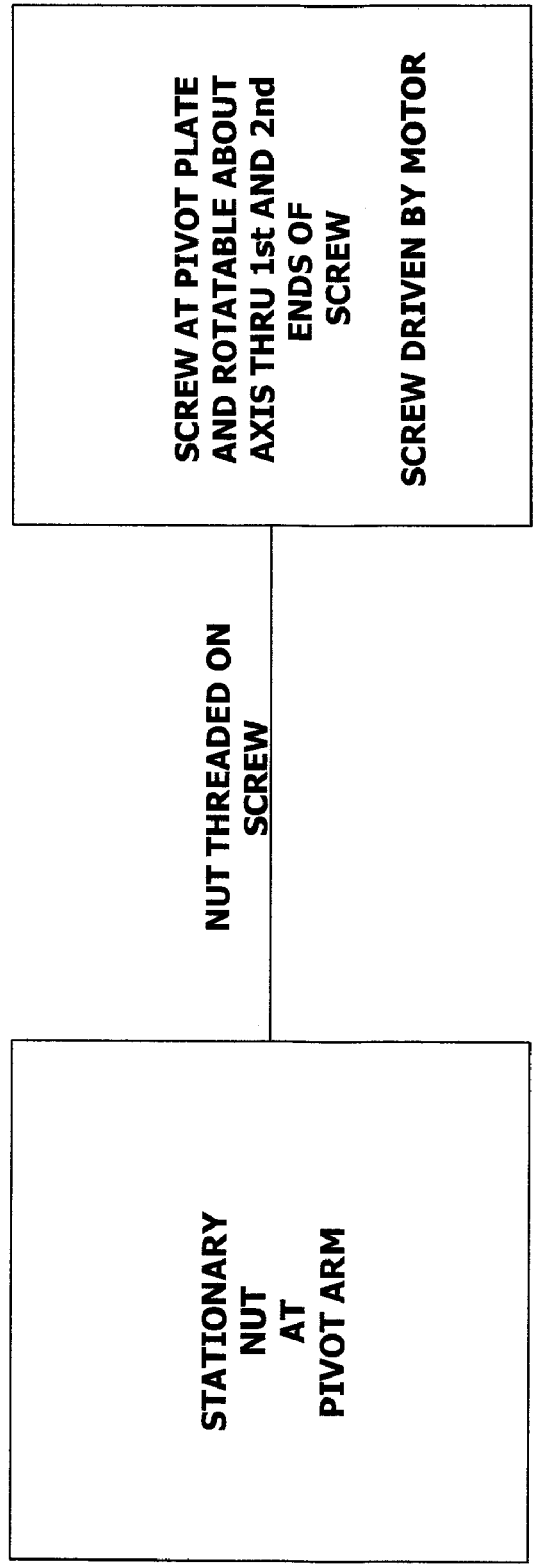
FIG. 17 is a schematic view of second embodiment of the linear movement assembly according to the present invention.
Figure 18:
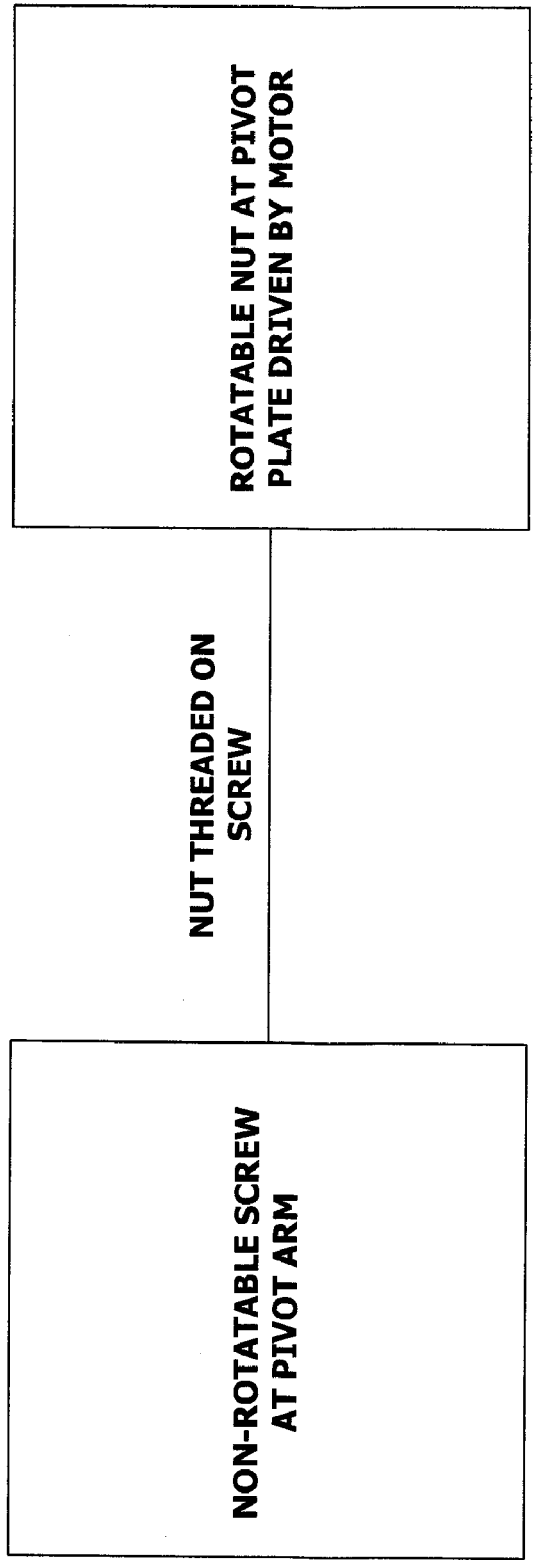
FIG. 18 is a schematic view of third embodiment of the linear movement assembly according to the present invention.
Figure 19:
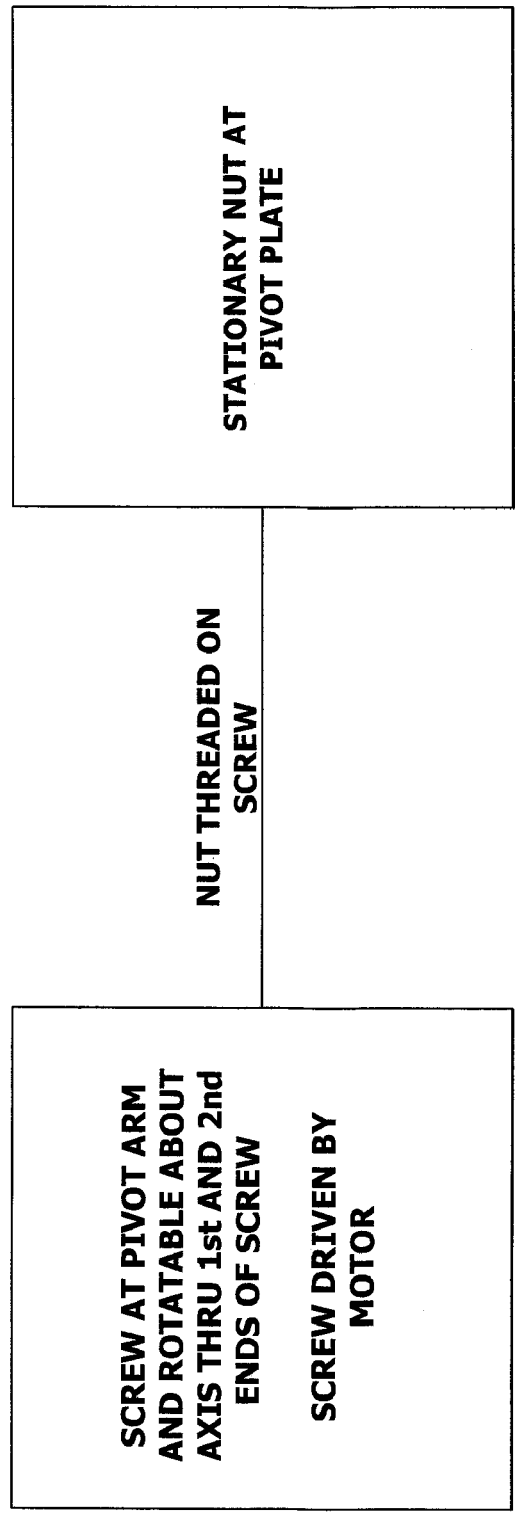
FIG. 19 is a schematic view of fourth embodiment of the linear movement assembly according to the present invention.
Figure 20:
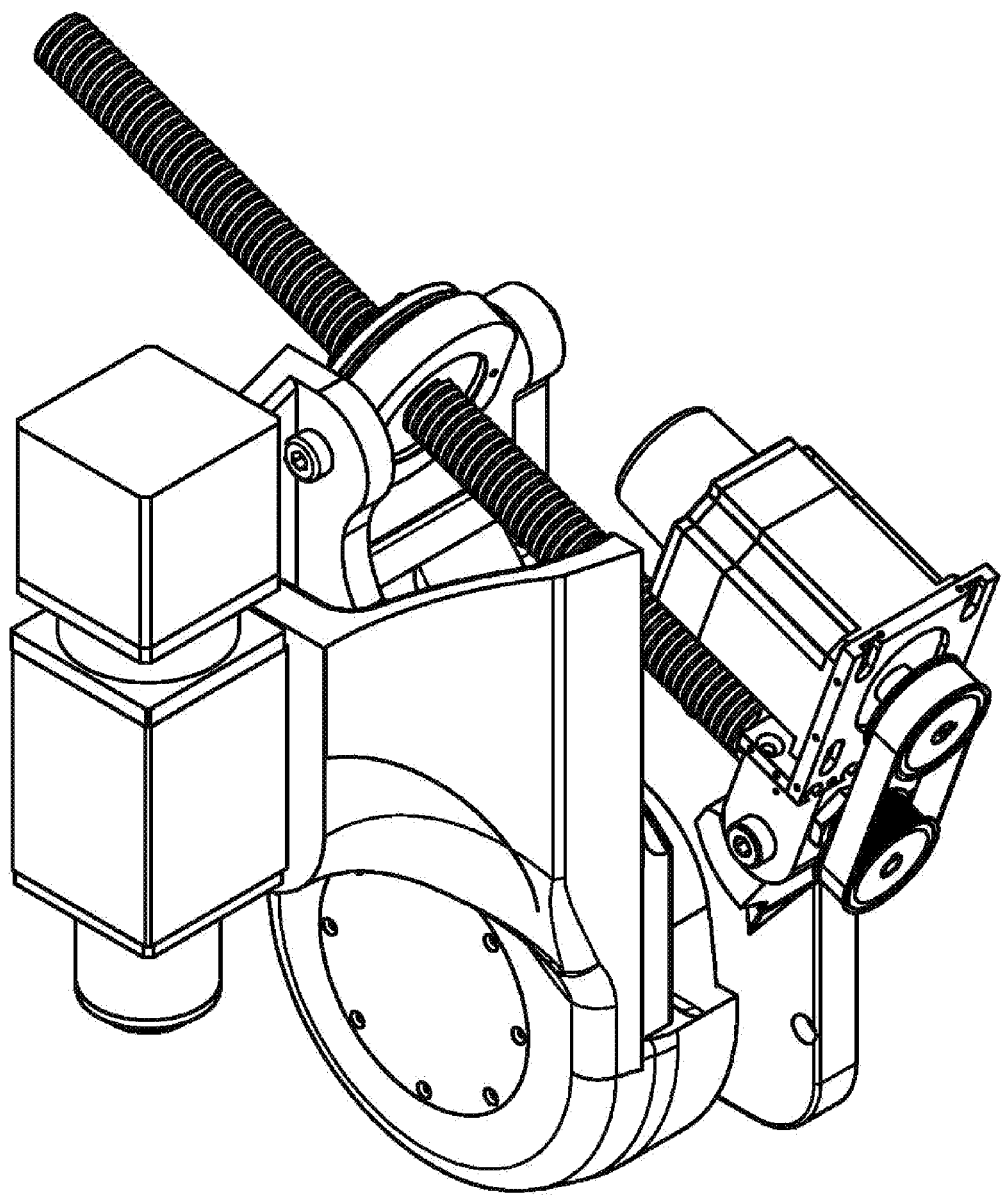
FIG. 20 is a perspective view of a second embodiment of the linear movement assembly according to the present invention.
Figure 21:
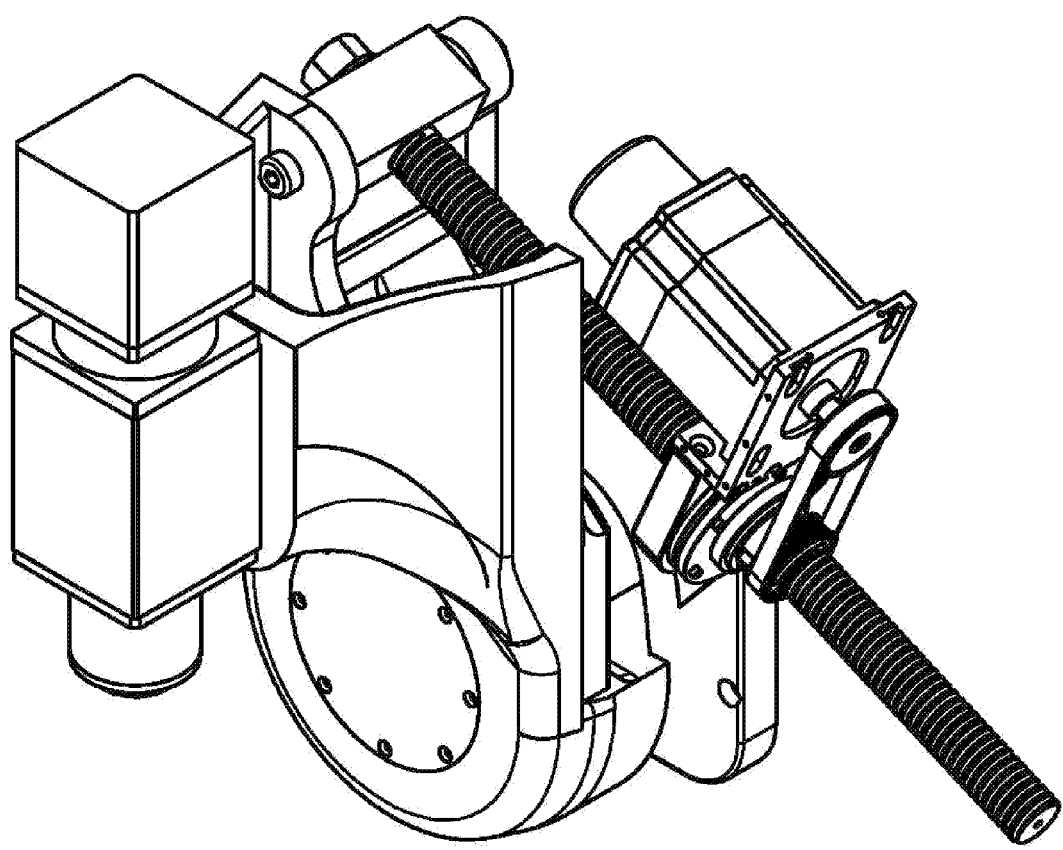
FIG. 21 is a perspective view of a third embodiment of the linear movement assembly according to the present invention.
Figure 22:
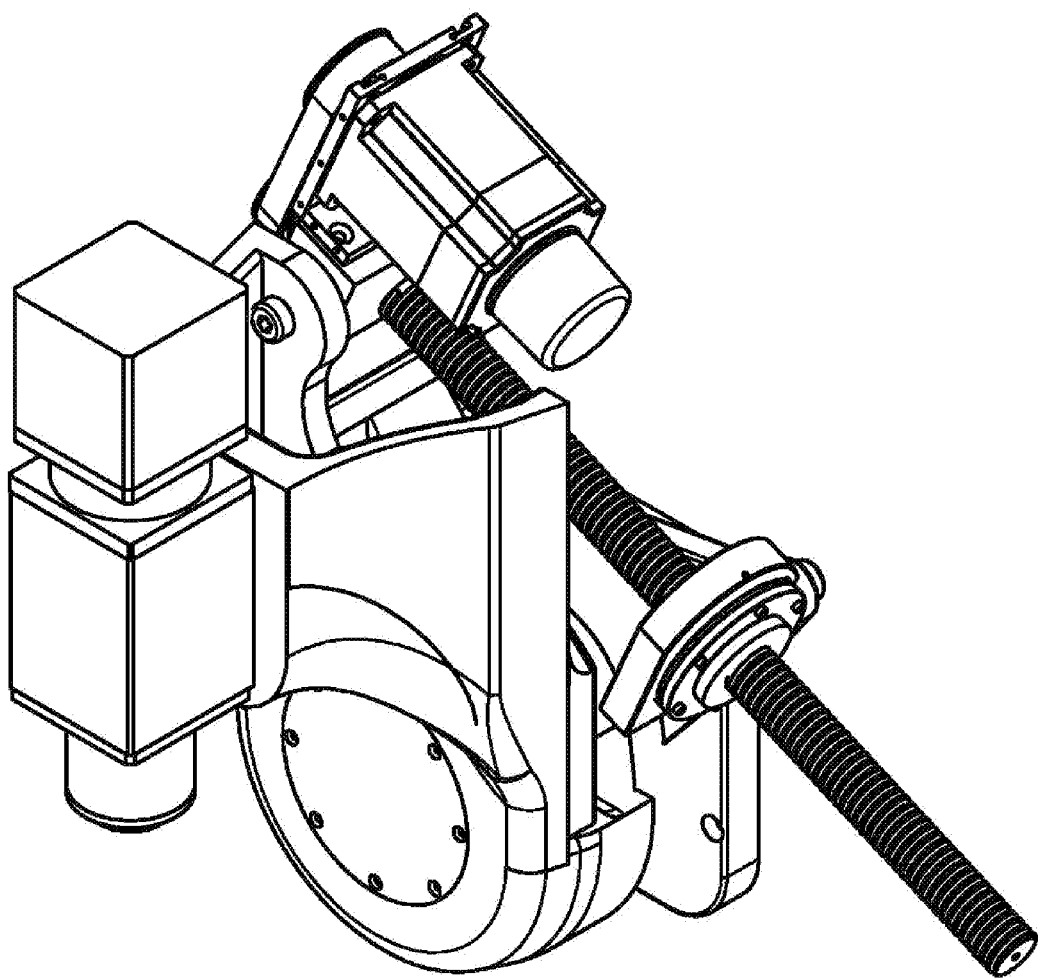
FIG. 22 is a perspective view of a fourth embodiment of the linear movement assembly according to the present invention.

The linear movement assembly described above is a first embodiment that includes the screw 20 being held stationary at the first connection point and motion nut 18 being rotatable at the second connection point, such that the motion nut 18 moves along the screw 20 causing the pivot arm 26 to rotate. It is envisioned that there are three other embodiments that could be used that include a screw and a nut. The relationship of the nut and screw of the second embodiment is shown schematically in FIG. 17 and an example is shown in FIG. 20. The second embodiment would include the motion nut replaced with a stationary nut that is connected to the pivot arm in such a way to have a degree of freedom of movement at the second connection point. The second embodiment would have the screw rotated by a servo motor and the screw would be connected to the pivot plate in such a way to have a degree of freedom of movement at the first connection point. Whereby, in the second embodiment the screw is rotating and not the nut. The relationship of the nut and screw of the third embodiment is shown schematically in FIG. 18 and an example is shown in FIG. 21. The third embodiment would include a motion nut rotatably connected to the pivot plate at the first connection point instead of the stationary screw. The third embodiment would have the screw fixed in a stationary position to the pivot arm at the second connection point in such a way that there would be a degree of freedom of movement between the screw and the second connection point. Whereby, the motion nut is rotating and the screw is not rotating. The relationship of the nut and screw of the fourth embodiment is shown schematically in FIG. 19 and an example is shown in FIG. 22. In the fourth embodiment there would be a stationary nut connected to the pivot plate at the first connection point in such a way that there would be a degree of freedom of movement between the stationary nut and the first connection point. In the fourth embodiment there would be a screw rotatable by a servo motor and rotatably connected to the pivot arm at the second connection point in such a way that there would be a degree of freedom of movement between the screw and the second connection point. Whereby, in the fourth embodiment the screw is rotating and not the nut. All in all, all four embodiments would have linear motion between the screw and nut, which rotates the pivot arm about the pivot plate.

The present invention also includes a method of rotating an articulating head using precise computer controlled linear motion to rotate the articulating head. All articulating heads have some type of tool mount structure to mount a tool such as the pivot arm described above. All articulating heads have some type of base to mount the tool mount structure such as the pivot plate described above, whereby the tool mount structure rotates about the base. The installation of a ball screw and ball nut provides that precise linear motion, where one is attached to the tool mount structure and the other is attached to the base and where each one has a degree of freedom of movement where attached so that binding of the articulating head components does not occur during rotation between the tool mount structure and the base. A motor is attached such that it rotates either the ball screw or ball nut, where rotation of one of them causes the ball nut to move along the ball screw and hence rotation of the tool mount structure due to the attachment of one to the tool mount structure and the other to the base. This motor is usually a servo motor and is controlled by a computer using computer software dedicated to controlling the rotation of the tool mount structure based on what is required to be done to a work piece. The method includes having a computer commanding the motor using computer software to move the ball screw or ball nut to cause precise rotation of the tool mount structure due to the interconnections between the ball screw, ball nut, tool mount structure and base.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. An articulating head with a linear movement assembly, adapted to be used with a CNC machine to work on a work piece, comprising:

a pivot plate adapted to be attached and fixed to the CNC machine, said pivot plate attached to the CNC machine such that said pivot plate is movable back and forth on and by the CNC machine in one direction which is a movement in one directional plane, said pivot plate including a first connection point;

a pivot arm rotatably attached to said pivot plate at a pivot arm rotation point on said pivot plate such that rotation of said pivot arm is in a second directional plane parallel to said one directional plane of movement of said pivot plate, said pivot arm having a second connection point, and said pivot arm adapted to allow mounting of a tool to work on the work piece; and a linear movement assembly mounted to and between said first connection point of said pivot plate and said second connection point of said pivot arm to cause rotation of said pivot arm about said pivot plate, said linear movement assembly comprising a threaded rod mounted as a screw, a nut which threads onto said screw and a motor interconnected to one of said screw and nut to cause motion between said screw and said nut, said screw and said nut being mounted between said pivot plate and said pivot arm, whereby said motion induced between said screw and nut causes said pivot arm to rotate about said pivot plate;

wherein said screw is attached to a screw mount, said screw mount is rotatably attached to one of said first connection point and second connection point such that said screw mount rotates in a directional plane parallel to said one directional plane of movement of said pivot plate.

2. The articulating head of claim 1, wherein said screw is attached to said first connection point at said pivot plate, said screw having a first end and a second end, said first end of said screw being supported near said first connection point at said pivot plate in a fixed position so that said screw cannot rotate about an axis between said first and second ends of said screw; wherein said nut is attached to said second connection point at said pivot arm and threaded onto said screw; and wherein said motor is attached to said nut to rotate said nut, where rotation of said nut causes said pivot arm to rotate about said pivot plate at said pivot arm rotation point due to movement of said nut along said screw in a linear motion.

3. The articulating head of claim 1, wherein said screw is a ball screw and said nut is a ball nut.

4. The articulating head of claim 1, wherein said pivot plate includes a boss at said pivot arm rotation point to receive said pivot arm and wherein said pivot arm includes a bearing boss hole to fit over said boss, such that said pivot arm rotates about said boss.

5. The articulating head of claim 2, wherein said screw is rotatably mounted to said first connection point of said pivot plate, such that there is a freedom of movement at said first connection point at said pivot plate during rotation of said pivot arm about said pivot plate; and wherein said nut is rotatably attached to said second connection point of said pivot arm, such that there is a freedom of movement at said second connection point at said pivot arm during rotation of said pivot arm about said pivot plate.

6. The articulating head of claim 2, wherein said motor includes a motor pulley; wherein said nut includes a nut pulley attached to said nut; and further including a belt mounted about said motor pulley and said nut pulley, such that rotation of said motor pulley turns said belt, which in turn rotates said nut pulley and said nut.

7. The articulating head of claim 2, wherein said nut is enclosed in a nut housing such that said nut can rotate within said nut housing and said nut housing is mounted to said pivot arm.

8. The articulating head of claim 5, wherein said first connection point includes screw mount that rotatably attaches to said pivot plate; wherein said screw mount includes a hole to receive said screw.

9. The articulating head of claim 8, further including a bearing mount to attach said screw mount to said pivot plate, such that said screw mount rotates about said bearing mount.

10. The articulating head of claim 2, wherein said second connection point includes a nut mount rotatably attached to said pivot arm to provide a freedom of movement, said nut rotatably attaches to said nut mount to provide for attachment of said nut to said pivot arm.

11. The articulating head of claim 10, wherein said pivot arm includes a first bearing mount extending out from said pivot arm that connects to one side of said nut mount such that said nut mount rotates about said bearing mount; and wherein there is second bearing mount connected to an opposite side of said nut mount that is opposite said first bearing mount, said second bearing mount connecting such that said nut mount rotates about said second bearing mount, and said second bearing mount is supported off of said pivot arm.

12. The articulating head of claim 1, wherein said motor is a precision computer controlled motor so that said motor can be controlled to provide precision positioning of said nut along said screw during machining.

13. The articulating head of claim 1, wherein said screw is attached to said first connection point at said pivot plate, said screw having a first end and a second end, said first end of said screw being supported near said first connection point at said pivot plate; wherein said nut is attached to said second connection point at said pivot arm and threaded onto said screw and said nut being in a fixed position such that said screw moves through said nut when said screw is rotated about an axis between said first and second ends of said screw; and wherein said motor is attached to said screw to rotate said screw, where rotation of said screw causes said pivot arm to rotate about said pivot plate at said pivot arm rotation point due to movement of said screw through said nut in a linear motion.

14. The articulating head of claim 13, wherein said screw is rotatably mounted to said first connection point of said pivot plate, such that there is a freedom of movement at said first connection point at said pivot plate during rotation of said pivot arm about said pivot plate; and wherein said nut is rotatably attached to said second connection point of said pivot arm, such that there is a freedom of movement at said second connection point at said pivot arm during rotation of said pivot arm about said pivot plate.

15. The articulating head of claim 1, wherein said screw is attached to said second connection point at said pivot arm, said screw having a first end and a second end, said first end of said screw being supported near said second connection point at said pivot arm in a fixed position so that said screw cannot rotate about an axis between said first and second ends of said screw; wherein said nut is attached to said first connection point at said pivot plate and threaded onto said screw; and wherein said motor is attached to said nut to rotate said nut, where rotation of said nut causes said pivot arm to rotate about said pivot plate at said pivot arm rotation point due to movement of said nut along said screw in a linear motion.

16. The articulating head of claim 15, wherein said screw is rotatably mounted to said second connection point of said pivot arm, such that there is a freedom of movement at said second connection point at said pivot arm during rotation of said pivot arm about said pivot plate; and wherein said nut is rotatably attached to said first connection point of said pivot plate, such that there is a freedom of movement at said first connection point at said pivot plate during rotation of said pivot arm about said pivot plate.

17. The articulating head of claim 1, wherein said screw is attached to said second connection point at said pivot arm, said screw having a first end and a second end, said first end of said screw being supported near said second connection point at said pivot arm; wherein said nut is attached to said first connection point at said pivot plate and threaded onto said screw and said nut being in a fixed position such that said screw moves through said nut when said screw is rotated about an axis between said first and second ends of said screw; and wherein said motor is attached to said screw to rotate said screw, where rotation of said screw causes said pivot arm to rotate about said pivot plate at said pivot arm rotation point due to movement of said screw through said nut in a linear motion.

18. The articulating head of claim 17, wherein said screw is rotatably mounted to said second connection point of said pivot arm, such that there is a freedom of movement at said second connection point at said pivot arm during rotation of said pivot arm about said pivot plate; and wherein said nut is rotatably attached to said first connection point of said pivot plate, such that there is a freedom of movement at said first connection point at said pivot plate during rotation of said pivot arm about said pivot plate.

* * * * *